(12) United States Patent
Finlay et al.

(10) Patent No.: US 12,082,522 B2
(45) Date of Patent: Sep. 10, 2024

(54) METHODS AND APPARATUS FOR AGRICULTURE

(71) Applicant: Sensortine Pty Ltd, Orange (AU)

(72) Inventors: Davidson Alexander Finlay, Orange (AU); Wendy Louise Finlay, Orange (AU); Paul Andrew Mullins, Orange (AU); Gordon Stephen Howard, Orange (AU)

(73) Assignee: Sensortine Pty Ltd, Orange (AU)

( * ) Notice: Subject to any disclaimer, the term of this patent is extended or adjusted under 35 U.S.C. 154(b) by 726 days.

(21) Appl. No.: 17/299,983

(22) PCT Filed: Dec. 6, 2019

(86) PCT No.: PCT/AU2019/051340
§ 371 (c)(1),
(2) Date: Jun. 4, 2021

(87) PCT Pub. No.: WO2020/113284
PCT Pub. Date: Jun. 11, 2020

(65) Prior Publication Data
US 2022/0022365 A1    Jan. 27, 2022

(30) Foreign Application Priority Data

Dec. 7, 2018   (AU) .................. 2018904662

(51) Int. Cl.
*A01C 7/20*    (2006.01)
*A01B 63/111*  (2006.01)
(Continued)

(52) U.S. Cl.
CPC .......... *A01C 7/203* (2013.01); *A01B 63/1115* (2013.01); *A01B 79/005* (2013.01); *A01C 5/062* (2013.01); *A01C 7/105* (2013.01)

(58) Field of Classification Search
CPC ......... A01C 7/203; A01C 5/062; A01C 7/105; A01C 7/201; A01C 7/20; A01C 7/00;
(Continued)

(56) References Cited

U.S. PATENT DOCUMENTS

| | | |
|---|---|---|
| 2003/0066357 A1 | 4/2003 | Upadhyaya et al. |
| 2005/0005704 A1 | 1/2005 | Adamchuk et al. |

(Continued)

OTHER PUBLICATIONS

International Search Report and Written Opinion for Application No. PCT/AU2019/051340 dated Feb. 17, 2020 (13 pages).
(Continued)

*Primary Examiner* — Christopher J. Novosad
(74) *Attorney, Agent, or Firm* — Michael Best & Friedrich LLP (57) ABSTRACT

An includes a soil-sensing arrangement. The apparatus (1) includes a seed-delivery mechanism. The soil-sensing arrangement includes one or more soil-sensing elements. Each of the one or more soil-sensing elements senses one or more conditions of the soil. The one or more soil-sensing elements can take the form of one or more soil-sensing tines (19). In the method, material is delivered to a locally-optimised soil depth LOD. In the method, there is at least periodic sensing of one or more conditions of the soil, and at two or more depths at mutually differing proximities to the locally-optimised depth.

17 Claims, 6 Drawing Sheets

(51) Int. Cl.
*A01B 79/00* (2006.01)
*A01C 5/06* (2006.01)
*A01C 7/10* (2006.01)

(58) Field of Classification Search
CPC .. A01C 5/02; A01C 5/00; A01C 7/102; A01C 7/10; A01C 7/08; A01B 63/1115; A01B 79/005; A01B 63/111; A01B 63/10; A01B 63/102; A01B 63/00; A01B 79/00
See application file for complete search history.

(56) References Cited

U.S. PATENT DOCUMENTS

| | | |
|---|---|---|
| 2017/0094889 A1 | 4/2017 | Garner et al. |
| 2018/0168094 A1 | 6/2018 | Koch et al. |

OTHER PUBLICATIONS

International Preliminary Report on Patentability for Application No. PCT/AU2019/051340 dated Mar. 22, 2021 (6 pages).

METHODS AND APPARATUS FOR AGRICULTURE

TECHNICAL FIELD

The disclosure relates to methods and apparatus for agriculture.

BACKGROUND

Optimising yield is an important concern in agriculture. Seed germination rates and other factors influencing crop yield depend upon the conditions of the soil. Accordingly, various existing approaches entail assessing the conditions of the soil when seeding or otherwise adding matter to the soil, e.g. including or when adding fertiliser.

Whilst a wide range of soil conditions can impact upon crop performance, soil moisture can be important, particularly in relation to seed germination.

Historically, farmers have dug their fields to manually assess the moisture at various depths. Generally, soil that can be rolled into a ball and retain its shape has been considered ideal.

Typically, soil conditions are not uniform over a large agricultural area. Accordingly, this manual assessment of the soil moisture might be repeated at a variety of test sites spread across the area. The depth at which seeds are planted may be varied in response to the varying soil and moisture levels.

More recently, various automated soil-sensing apparatus have been suggested. Some entail a soil-sensing seed firmer that moves along a furrow following a seed outlet, pressing the seeds into the soil whilst sensing the condition of the soil.

It is not admitted that any of the information in this patent specification, including the information recited in the Background, is common general knowledge in Australia or any other country.

SUMMARY OF THE DISCLOSURE

One aspect of the disclosure provides an apparatus for seeding soil. The apparatus comprises a soil-sensing arrangement and a seed-delivery mechanism. The soil-sensing arrangement comprises one or more soil-sensing elements. Each of the one or more soil-sensing elements can be configured to sense one or more conditions of the soil. The one or more soil-sensing elements can comprise one or more soil-sensing tines. The apparatus can adjust the one or more soil-sensing tines to one of the sensed different depths, being a locally-optimised depth. The seed-delivery mechanism can deliver seed on the fly to the locally-optimised depth.

The Applicant has recognised that improvements may be made over the existing automated arrangements and over the known manual methods. Thus, the apparatus as disclosed herein may provide improvements in and for agriculture, or at least may provide useful alternatives for those concerned with agriculture.

In an embodiment, the one or more soil-sensing elements may be integrated with the one or more soil sensing tines. Thus, the soil sensing element may engage the ground simultaneously as the ground is traversed, rather than having the sensor trailing behind the ground engaging tine/s. This may improve the quality of the data collected and may assist with optimising the depth and rate of delivery for the seed-delivery mechanism.

In an embodiment, the seed-delivery mechanism may be responsive to the soil-sensing arrangement, to deliver at least most of the seed to a locally-optimised depth. This may improve crop performance, particularly in relation to seed germination.

In an embodiment, the soil-sensing arrangement may be configured to, at least periodically, sense at two or more depths, at mutually-differing proximities to the locally optimised depth, to provide an indication of a local soil condition profile. Such data may be gathered, stored, processed and/or optimised for providing such information including soil profiling, soil historical data, soil seeding response information, etc.

In a further aspect, there is disclosed an apparatus for seeding soil. The apparatus can comprise a soil-sensing arrangement and a material-delivery mechanism (e.g. a seed-delivery mechanism). The material-delivery mechanism can be configured to respond to the soil-sensing arrangement.

The soil-sensing arrangement can comprise one or more soil-sensing elements. Each of the one or more soil-sensing elements can be configured to sense one or more conditions of the soil. The seed-delivery mechanism can be responsive to the soil-sensing arrangement to deliver at least most of the seed to a locally-optimised depth.

The soil-sensing arrangement may be configured to, at least periodically, sense at two or more depths at mutually-differing proximities to the locally-optimised depth.

This may be advantageous because seeds placed into soil that is overly dry are unlikely to germinate without precipitation or irrigation. In addition, seeds that are placed unnecessarily deep within the soil, may result in delayed germination and may require increased energy consumption during the seeding process due to the increased earth resistance on the tine.

In an embodiment, the apparatus may comprise two or more of the soil-sensing elements arranged to sense at mutually differing depths. In an embodiment, at least one of the one or more soil sensing elements may have sensing portions spaced vertically to sense at differing depths. The two or more of the soil-sensing elements can thereby provide a profile/information across a depth of soil.

In an embodiment, the soil-sensing arrangement may be configured to at least periodically move at least one of the one or more soil-sensing elements to differing depths, e.g. move in response to one or more conditions of the soil. In other words, the apparatus may adjust (e.g. automatically/responsively) to varying/variable soil conditions across an area.

In an embodiment, at least one of the one or more soil-sensing elements may be arranged to be a leading soil-engaging element. Such simultaneous sensing of the soil properties, whilst opening up the soil with the tine, may advantageously provide improved accuracy in the data collected. In addition, by gathering the soil data simultaneously as the soil is opened, the data may be collected prior to the escape of any humidity contained within the soil.

In an embodiment, at least one of the one or more soil-sensing elements may be shaped to pull down when moved horizontally through the soil.

In an embodiment, at least one seed-outlet may be fixed relative to at least one of the one or more soil-sensing elements. This may improve robustness and reliability of the apparatus.

In an embodiment, the seed-delivery mechanism may be responsive, to the soil-sensing arrangement, to vary a seeding rate. Such variation may form part of a control procedure/algorithm or may be decided by e.g. a farmer.

In an embodiment, the one or more soil conditions may comprise soil moisture.

However, it should be understood that additional or different soil conditions may be sensed/detected/measured (e.g. temperature, humidity, pH, carbon, biomass, salinity, etc.).

In an embodiment, the seed-delivery mechanism may be responsive to input indicative of a drag on at least one soil-engaging element (e.g. the mechanism may be responsive to input indicative of a drag on at least one of the one or more soil-sensing elements). The apparatus (e.g. its depth in the soil) can adjust accordingly (e.g. part of a control procedure/algorithm or as determined by e.g. a farmer). The drag may be measured utilising a strain gauge and/or a load cell.

In a further aspect, there is disclosed an apparatus for delivering matter to soil. The apparatus comprises one or more soil-engaging elements and a mechanism for monitoring a drag on at least one of the one or more soil engaging elements. The drag may be measured utilising a strain gauge and/or a load cell.

In a further aspect, there is disclosed a method of assessing a condition of soil. The method comprises:
moving one or more elements through the soil, and;
monitoring a drag on the one or more elements.

In the method, the drag may be measured by measuring strain and/or load.

In a further aspect, there is disclosed a method of delivering material to soil. The method comprises:
delivering the material to a locally-optimised depth; and
at least periodically sensing one or more conditions of the soil at two or more depths at mutually differing proximities to the locally-optimised depth.

BRIEF DESCRIPTION OF DRAWINGS

Embodiments will now be described, by way of example only, with reference to the accompanying drawings in which.

DESCRIPTION OF EMBODIMENTS

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Figure 1:
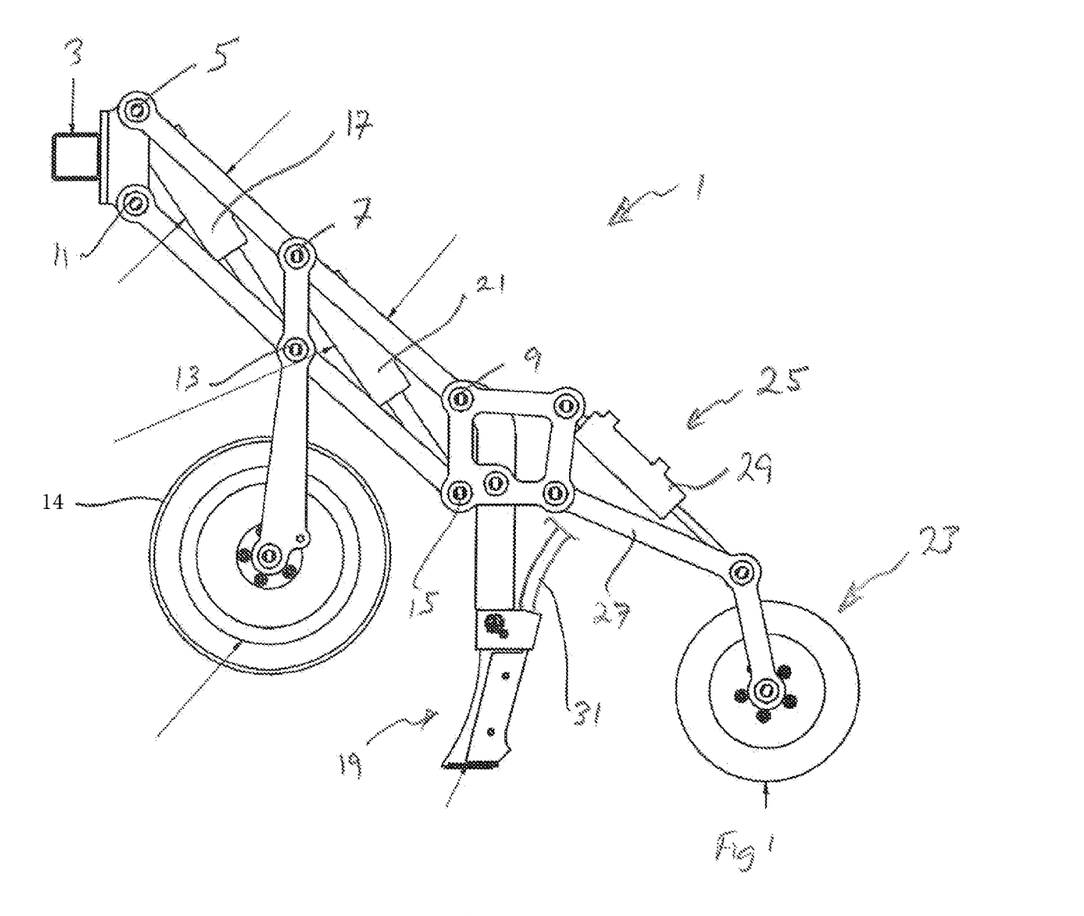
FIG. 1 is a side view of a row unit.

FIG. 1 illustrates a row unit 1 for planting seeds. The row unit 1 is mountable to the crossbar 3 of a vehicle, such as a seed-planting rig that is in use towed by a tractor.

As the wording is used herein, the row unit, the planting rig and the rig-tractor combination are non-limiting examples of seed-planting devices.

The row unit 1 comprises a set of linkages pivotally connected to each other at nodes 5, 7, 9, 11, 13, 15. The nodes 5, 11 are fixed relative to the crossbar 3 whilst the nodes 7, 13 are fixed relative to a gauge wheel 14. The nodes 5, 7, 11, 13 define the vertices of a parallelogram diagonalled by a resilient bias 17 to form a suspension arrangement by which the gauge wheel 14 is suspended relative to the crossbar 3. In this example, the bias 17 takes the form of the combination of a hydraulic ram and an accumulator. Pneumatic rams and simple springs are other options. Indeed, other suspension arrangements more generally are possible.

The suspension arrangement downwardly drives the gauge wheel 14 to follow the surface of the soil. The nodes 7, 13 thus may run at a substantially fixed height relative to the soil surface. Other contacting-type gauge arrangements, such as a skid, are possible. These contact-type gauge arrangements may entail one or more encoders (such as radial encoder(s) or linear encoder(s)). Non-contact surface-sensing arrangements are also possible—these may be ultrasonic or laser.

The row unit 1 further includes a tine 19. Those skilled in the art would appreciate that the body of the tine 19 can be formed in a wide variety of shapes, sizes, and styles depending on soil types or plough manufacturer.

Figure 2:
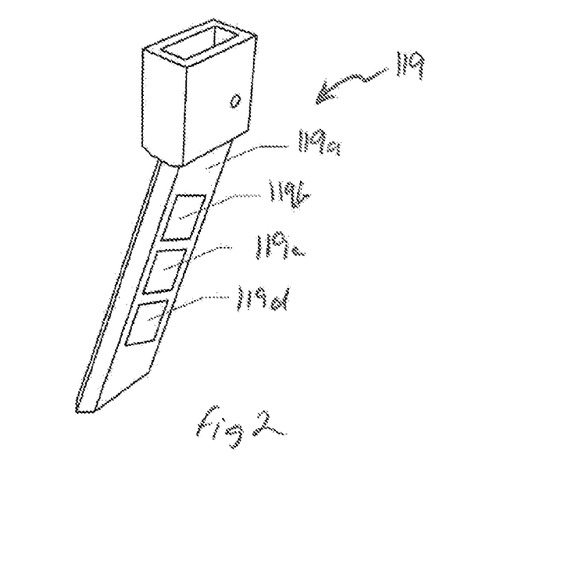
FIG. 2 is a perspective view of a tine with a prong-shaped body.

In some embodiments, such as in FIGS. 1 and 2 for example, the tine 19, 119 can be formed to comprise a tubular body with a prong or sharp point disposed at the in-use lower end. In some embodiments, such as in FIGS. 6 and 7, the tine 619, 719 can comprise a body that is formed to have a chisel style point. In other embodiments, such as in FIGS. 8 and 9, the tine 819, 919 can be formed as a disc, coulter disc, or multiple discs. Those skilled in the art would appreciate that any suitable material may be used to form the rigid parts of the tine 19. For examples, suitable materials can include steel; cast steel; ceramics; carbides or any of a wide range of alloy materials that have wear and abrasion resistant properties.

The nodes 7, 9, 13, 15 define the vertices of a parallelogram diagonalled by an actuator 21 to form a depth-adjusting mechanism by which the depth of the tine 19 relative to the soil surface is adjustable. The actuator 21 is preferably substantially non-compliant. A hydraulic ram is a suitable option. A ball screw is another possibility. The use of the parallelogram in this way maintains the angular orientation of the tine 19 relative to the soil for a controlled approach to opening the soil. This fixed orientation is also convenient in the context of sensing portions vertically spaced along the tine, although other forms of depth-adjusting mechanism are possible.

A press wheel 23 is suspended by a suspension 25 to follow behind the tine 19. The suspension 25 comprises a trailing arm 27 and a bias 29. The bias 29 may be akin to the bias 17. Again, other suspension arrangements are possible. The press wheel serves to ensure that the soil coverage over the placed seed is well compacted. The force from the bias 29 may be adjusted based on soil type, potentially in response to data gathered during the seeding operation, to optimise the closure of the soil. By way of example, heavier clays will typically need more effort for good compaction than a sandy soil. Other soil-closing arrangements are possible.

Tine 19 is preferably a seed-planting tine having a seed-delivery outlet fixed relative thereto. By way of example, the tine may be a tubular tine through which seeds are pneumatically conveyed by a suitable seed-delivery mechanism 31. Alternatively, a seed-delivery tube may be fixed to the rear of the tine 19.

The tine 19 is preferably a soil-sensing tine comprising one or more convenient soil sensors, whereby the tine 19 can be configured to measure a condition or property of the soil. For example, these properties may include one or more of soil moisture, temperature, humidity, pH, carbon, biomass and salinity. The soil sensor can be a single sensor, or an array of sensors, with each sensor being configured to measure a condition or property of the soil at substantially the same depth at which the delivered seeds come to rest (i.e. at the planting depth).

FIG. 2 illustrates a preferred form of tine 119 that is both a tubular seed-planting tine and a soil-sensing tine.

The tine comprises a metallic body 119a and a trio of metallic bodies 119b, 119c, 119d spaced at differing vertical depths along the tine 119. The bodies 119a to 119d are electrically insulated against direct electrical contact with each other to gather data regarding the soil. Materials such as plastics, ceramics, or other suitable materials may be embedded into the tine to insulate between the metallic bodies 119a, 119b, 119c, 119d that are used for sensing and measuring electronic resistance between the metals.

Optionally, the body 119a may be formed of a differing metal to the bodies 119b to 119d, whereby a voltage between the dissimilar metals can be sensed to provide an indication of the condition of the soil. Alternatively, a voltage might be applied to provide an indication of the conductance of the soil. The sensing portions are preferably at the side(s) of the tine.

Of course, a wide range of potential soil-sensing arrangements are well known to a person of skill in the art. Preferably, at least one of the soil-sensing elements carries two different types of soil sensor. Most preferably, sensors are provided to measure conductivity, capacitance and temperature.

Optionally, for optimum results, different sensors may be employed for different soil types. Whilst a simple variant of the concept may entail only an electrical current sensor (conductivity) to measure moisture resistance/content in the soil, more elaborate sensing arrangements may be employed. Factors such as salinity, the level of biomass in the soil, and the soil type (sandy, loamy, black, etc.) can impact on the relationship between conductivity and soil moisture level. By utilising suitable other sensing arrangements to measure such parameters, a more accurate assessment of the soil moisture level can be made. By way of example, the tine can comprise one or more of the following sensors:

temperature sensors;
capacitance or frequency domain refractometry (FDR) sensors;
time domain refractometry (TDR) sensors;
time domain transmissiometry (TDT) sensors;
standing wave ratio sensors;
electromagnetic;
radar;
UV light;
pH;
carbon sensors (or other sensors identified to measure the levels of other specific elements.

The present inventors have recognised that the drag on the soil-engaging elements also provides a useful indication of soil condition and that, furthermore, this drag can be conveniently measured utilising a strain gauge. By way of example, strain on the tine per se might be measured and/or a pin-type strain gauge might be employed at one of the nodes of the row unit 1. One or more load cells associated with the crossbar 3, and/or even associated with the draw bar of the planting rig, may also be convenient. Indeed, parameters of the drive vehicle, such as the fuel-injector rate, may also be utilised to provide an indication of the drag of the tines relatable to the soil condition.

Preferred implementations of the concept apply logic to a variety of data sources to identify the locally-optimised planting depth.

Preferably, data is collected and correlated with location information (e.g. with GPS tracking) to create data sets (e.g. moisture maps) useful to optimise future planting operations.

By way of example, separate data sets may be gathered over a series of planting operations, e.g. over several seasons of cropping. This series of data sets may then be processed and combined to inform future material-delivery operations. By way of example, an initial estimate of the locally-optimised depth as a function of area may be provided and a planting operation may proceed by following this estimate. The estimate may be informed by historical events (e.g. weather, earlier crops and/or fertiliser applications). It may be additionally or alternatively informed by predicted future events such as predicted rain, scheduled irrigation and/or scheduled fertiliser application. The data sets generated by the one or more sensors of the soil-sensing element can be transmitted via a signal to an externally contained processing unit where the data sets can be measured, recorded and analysed.

A tine may be preferred over other potential soil-sensing elements such as firmers and coulters. A tine can provide measurements of the soil conditions deeper into the soil, when compared to other potential soil-sensing elements such as firmers and coulters. Typically, coulters penetrate no further than about 100 mm (4 inches), whereas tines are routinely used at depths as deep as about 250 mm (10 inches). The soil-sensing element is preferably a leading, or ground engaging, element of its respective row unit, to bring its sensing portions into contact with soil undisturbed by the present operation. Most preferably, the tine is configured to pull down as it is horizontally dragged through the soil. The illustrated tines project forward and downwards at an oblique angle for this purpose. Additionally or alternatively, the tines may be equipped with wings or other shaped formations for this purpose. In a variant, the soil-sensing element can be used in-line with other ground openers for seed placement. In a further variant, the soil-sensing element can be a trailing element.

Preferred variants of the row unit 1 are configured to vary the planting depth on the fly, to optimise the placement of the seed.

Figure 8:
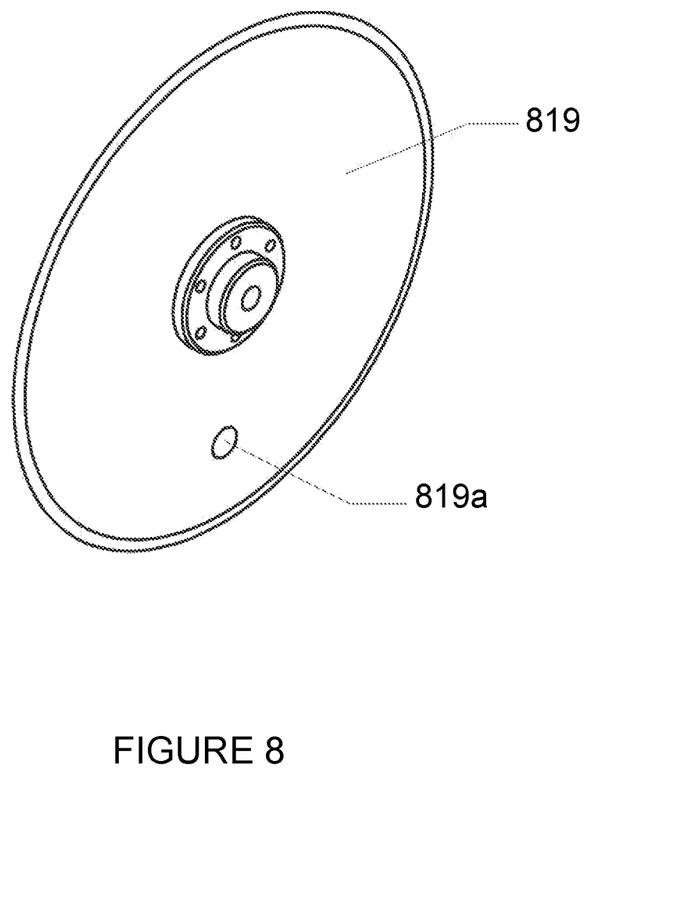
FIG. 8 is a perspective view of a tine comprising a body having a single disc, or coulter, with a single soil sensor.
Figure 9:
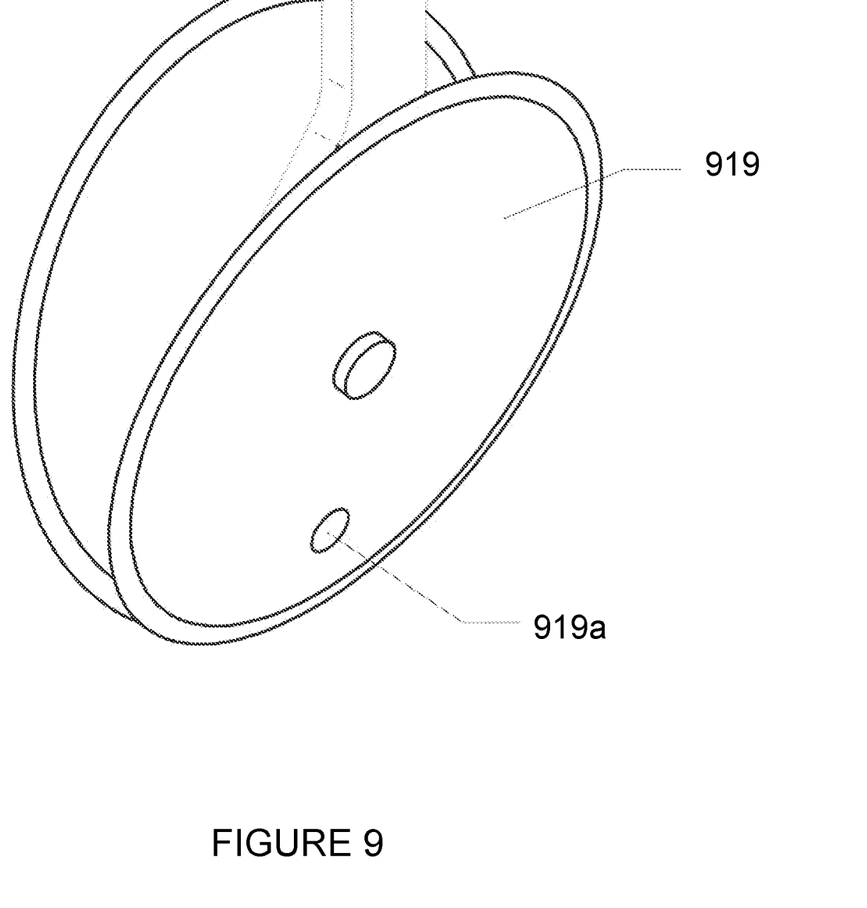
FIG. 9 is a perspective view of a tine comprising a body having a double disc arrangement with a single soil sensor.

In some embodiments, the soil-sensing elements can be embedded, or fully integrated into the soil engaging tine. For example, the tine 619 of FIG. 6 comprises a body having a chisel style point with dual embedded soil sensors 619a, 619b being horizontally displaced from one another across the tine 619 body. In a further example, the tine 719 of FIG. 7 comprises a body having a broad chisel style point with a single embedded soil sensor 719a centrally disposed towards the pointed tip of the tine 719. In yet another example, the tine 819 of FIG. 8 comprises a body shaped as a single disc or coulter. The tine 819 can comprise a single soil sensor 819a that is embedded at a distance from the outer rim of the tine 819 body so as to rotate about the central axis of the disc-shaped tine 819 in use. FIG. 9 shows a further embodiment, where the tine 919 comprises a double disc arrangement, with each tine disc comprising a single soil sensor that is embedded within the body. Each of the tine 919 discs can be rotated independently of one another. In a variation, the disc-shaped body can comprise a plurality of sensors embedded therein.

Figure 6:
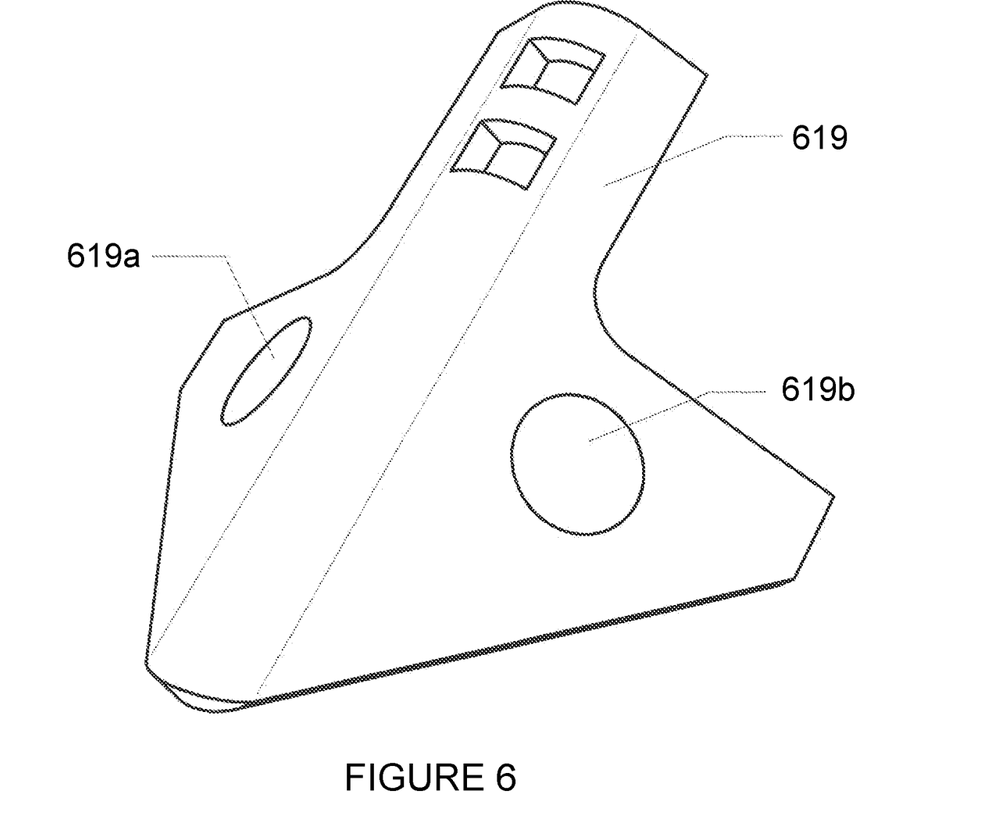
FIG. 6 is a perspective view of a tine comprising a body having a chisel style point with dual soil sensors.
Figure 7:
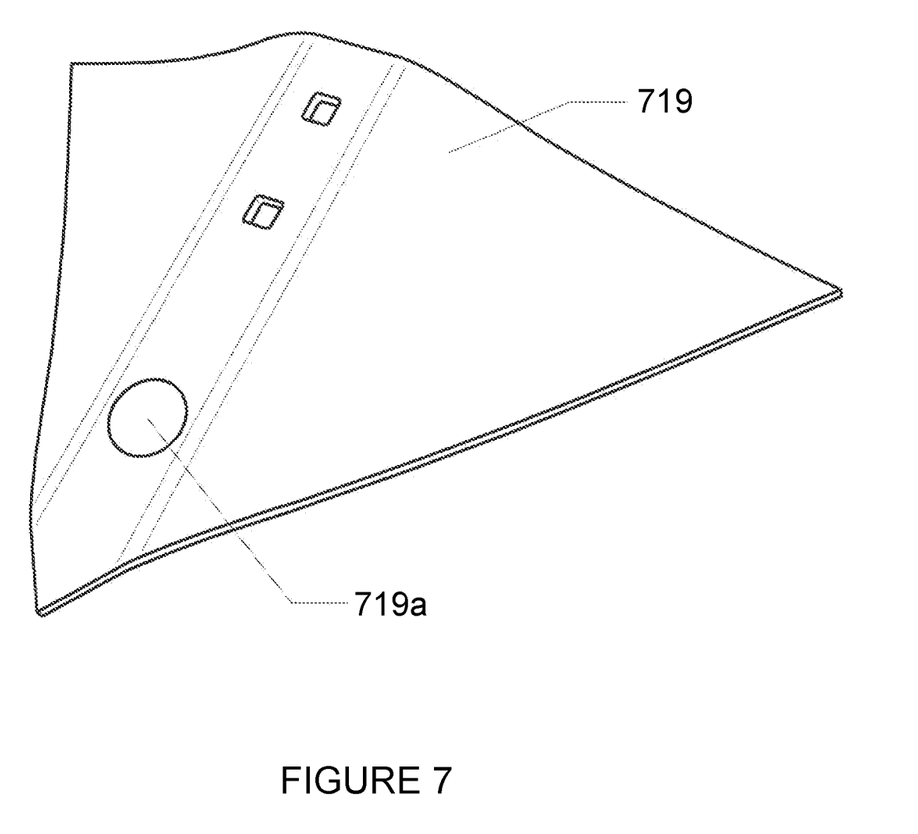
FIG. 7 is a perspective view of a tine comprising a body having a broad chisel style point with a single soil sensor.

In some embodiments, as shown in FIGS. 6 to 7, the tine 619, 719 can comprise a body that is formed to have a chisel style point. In other embodiments, such as in FIGS. 8 and 9, the tine 819, 919 can be formed as a disc, coulter disc, or multiple discs.

Figure 3:
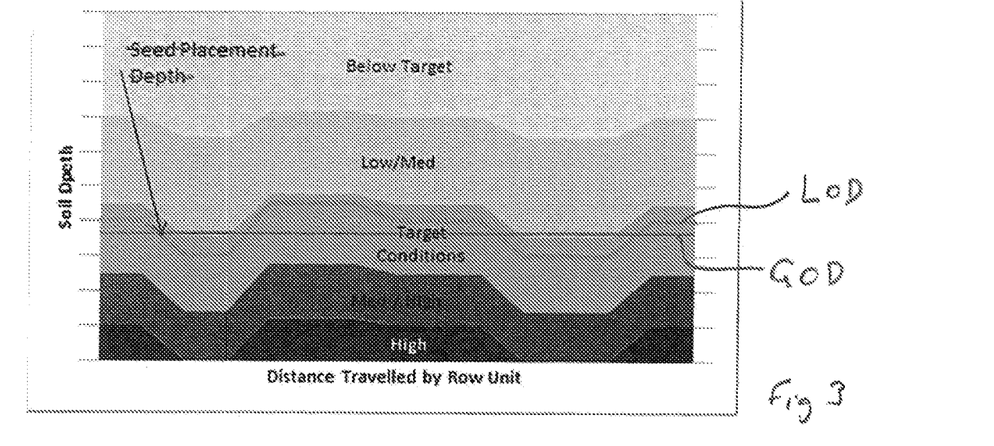
FIG. 3 is a cross-section view of typical soil.

FIG. 3 illustrates a typical soil profile. The upper stratum of soil is relatively dry, whereas progressively more moisture can be found by digging deeper into the soil. Also, as is not uncommon, the profile varies across the field being treated.

Following old manual techniques, all of the seed may well have been set at a single, globally-optimised depth GOD. By sensing and responding to soil conditions on the fly, the present disclosure provides that seed can be delivered to the locally-optimised depth LOD and thereby improve the performance of the seed.

Preferred variants of the present disclosure not only track the soil conditions in proximity to the LOD but also gather data regarding a soil condition profile, i.e. data regarding how the condition of the soil varies as a function of depth. As the wording (and similar wording) is used herein, a measurement at the LOD is a measurement at a proximity of 0 to the LOD, whereby measuring at the LOD and at some other depth is one example of measuring at two or more depths at mutually-differing proximities to the LOD.

Typical implementations of the concepts disclosed herein will entail soil condition data at discrete depths, although analogue equipment providing a substantially constant signal over a range of depths may be possible. As the wording (and similar wording) is used herein, this continuous signal is regarded as relating to an infinity of depths and is thus an example of information regarding two or more depths.

There may be various advantageous options for gathering this information. Preferably, soil condition data can be gathered on the fly during the material-delivery operation. In the context of a tine 19 configured to sense the soil moisture at one point, e.g. in the vicinity of the tip of the tine, the depth of the tine 19 may be adjusted, by periodically moving the tine 19 up or down (e.g. in the vicinity of 100 mm/min) to differing depths to hunt for information. The disclosed soil sensing apparatus and method can be used in an array of ground engaging devices when planting seeds. In the context of a seed-planting vehicle having a number of row units, e.g. 40 row units spread across a 12 m wide boom, only some (e.g. not more than one third) of the tines may be vertically moved. In some embodiments, only some (e.g. not more than one third) of the row units are sensing row units. The other row units may be controlled in response to the output from the sensing row units.

In some embodiments, the depth of the tines can be adjusted in response to the sensed conditions. By way of example, the tines might maintain a constant depth, or perhaps vary in a defined way such as in accordance with a predetermined moisture map, and then hunt to assess soil conditions only if the sensed amount of water (or sensed other condition) is outside of tolerance.

By way of example, in some embodiments, the tine might be periodically plunged to a bottom of a depth of interest and potentially held there for a predefined distance (e.g. 20 m) or a predefined time (e.g. 20 seconds). In some embodiments, the soil condition data can be used to adjust the in-field seeding rate and/or the in-field fertilizer rate.

In some embodiments, the row unit can be programmed to adjust one or more of the in-field seeding depth, in-field seeding rate, and the in-field fertilizer rate by receiving commands or a program from an external data set, such as satellite imagery or a third-party soil map.

In some embodiments, the tine 119, having sensing arrangements at differing depths (e.g. FIG. 2), can be dragged through the soil at a fixed depth to build up soil condition profile information. By way of example, in the context of a large rig having many row units, a small number of those small units may have tines akin to the tine 19 and configured to deliver seed below the globally-optimised depth whilst providing output by which the other tines of the row unit may be raised and lowered to optimise the overall performance of the seed. A variant of the tine (or delivery device more generally) may be configured to deliver material (e.g. seed) to one depth (e.g. the GOD) whilst sensing conditions above and below that depth. The sensor output can be processed on-board the row unit. This may be advantageous as the speed at which the row unit travels and/or the volume of data generated by the sensors may cause latency issues when using an external data engine. Furthermore, wireless data communication networks and/or wireless fidelity networks may not be present on large farms, and in some situations when they are present, may not be sufficiently reliable for this purpose.

Figure 4:
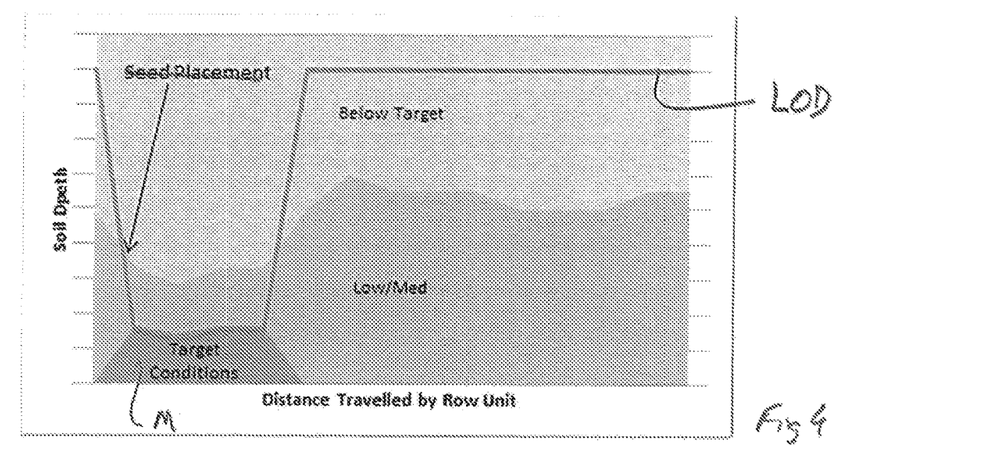
FIG. 4 is a cross-section view of soil after a prolonged dry period.
Figure 5:
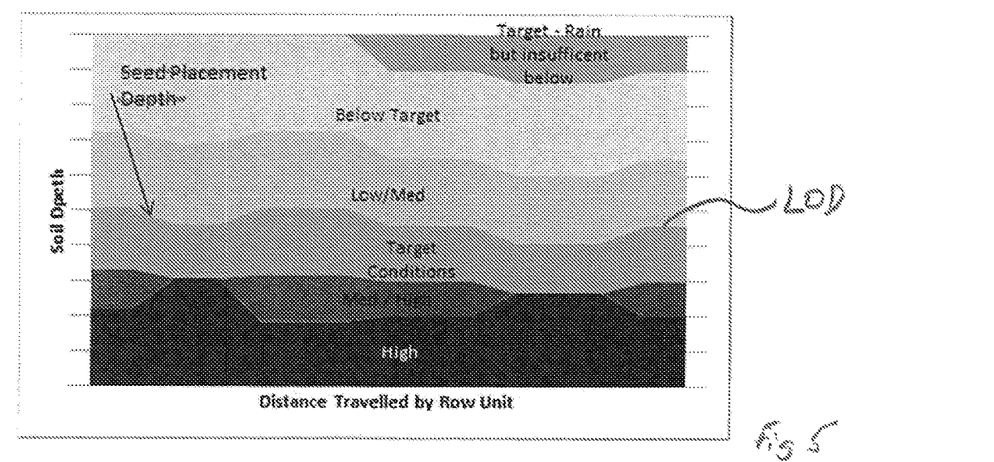
FIG. 5 is a cross-section view of soil after recent rain.

FIGS. 4 and 5 illustrate two scenarios in which condition profile information may be particularly advantageous. FIG. 4 illustrates dry soil after a long period without rain. In this scenario, seed might be 'dry sown' at a minimal depth in the hope that the rains will come. If, for example, a seed-planting device having a moisture sensing firmer was planting from right to left, seeds may well be dry sown across the entire field. In accordance with preferred variants of the disclosure, the tine 19, during its periodic hunt for moisture, may well locate the area of moisture M at depth, whereat the seeds can be sown for improved yield. As the unit 1 passes that moist patch, it automatically reconfigures itself to resume dry sowing.

FIG. 5 illustrates another example wherein the soil condition profile has a local extrema in which other soil-sensing planting arrangements might be trapped. The cross-section of FIG. 5 corresponds to typical soil shortly after rain. Towards the top right of the illustration is a region of soil having a target moisture level, whereas deeper down there is a larger area of soil within target parameters in which seeds are likely to perform better. By building up the soil profile information, preferred variants of the disclosure not only follow the target conditions but seek out the best possible target conditions.

The disclosure is not limited to the examples described herein. By way of example, whilst various examples entailing automated material-delivery mechanisms responsive to the sensing arrangement have been described, some variants of the hardware may entail a display for displaying soil profile information to an operator, to enable the operator to respond to that information, e.g. to cease planting (or otherwise delivering material) or to otherwise control the material-delivery mechanism. Some variants of the hardware may entail a display in addition to an automated response, e.g. an operator may be permitted to override automated decisions to facilitate decision-making based on external information and/or human intuition.

In some variations of the disclosure, the soil sensing tine can be supplied as a retro-fit solution to original manufactures equipment. In some variations of the disclosure, the soil sensing tine can replace the tine of an existing seed planting device.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the apparatus and method.

What is claimed is:

1. An apparatus for seeding soil, comprising
   a soil-sensing arrangement comprising one or more soil-sensing elements that are integrated into one or more leading soil-engaging tines, the one or more soil-sensing elements being configured to sense one or more conditions of the soil at different depths and thereby adjust the one or more leading soil-engaging tines to one of the sensed different depths;
   a seed-delivery mechanism, the seed-delivery mechanism being configured to respond on the fly to the soil-sensing arrangement to deliver at least most of the seed to said one of the sensed different depths, being a locally-optimised depth.

2. The apparatus of claim 1, wherein the seed-delivery mechanism is integrated with the one or more leading soil-engaging tines.

3. The apparatus of claim 1, wherein the soil-sensing arrangement is configured to, at least periodically, sense at two or more of the different depths at mutually differing proximities to the locally-optimised depth.

4. The apparatus of claim 3, the soil-sensing arrangement comprising two or more of the soil-sensing elements arranged to sense at the mutually differing depths.

5. The apparatus of claim 1, wherein at least one of the one or more soil sensing elements has sensing portions spaced to sense at the different depths.

6. The apparatus of claim 1, wherein the soil-sensing arrangement is configured to at least periodically move at least one of the leading soil-engaging tines, and thereby move at least one of the one or more soil-sensing elements, in response to the conditions of the soil at the different depths.

7. The apparatus of claim 1, wherein at least one of the one or more leading soil-engaging tines is shaped to pull down when moved horizontally through the soil.

8. The apparatus of claim 1, comprising at least one seed outlet of the seed-delivery mechanism that is fixed relative to at least one of the one or more leading soil-engaging tines.

9. The apparatus of claim 1, wherein the seed-delivery mechanism is responsive to the soil-sensing arrangement to vary a seeding rate.

10. The apparatus of claim 1, wherein the one or more soil conditions comprise soil moisture.

11. The apparatus of claim 1, wherein the seed-delivery mechanism is responsive to input indicative of a drag on at least one of the one or more leading soil-engaging tines.

12. The apparatus of claim 11 wherein the input indicative of the drag is measured by a mechanism that comprises a strain gauge and/or a load cell.

13. A method of delivering a seed to soil, the method comprising:
    opening the soil with one or more leading soil-engaging tines comprising one or more soil-sensing elements integrated therein;
    sensing one or more conditions of the soil with the one or more soil-sensing elements at different depths as the soil is opened;
    adjusting the one or more leading soil-engaging tines to one of the sensed depths;
    adjusting a depth of the seed delivery on the fly to said one of the sensed depths, being a locally-optimised depth, and delivering at least most of the seed into the opened soil, in response to the sensed one or more conditions of the soil.

14. The method of claim 13, wherein the one or more soil-sensing elements are configured to, at least periodically, sense at two or more of the different depths at mutually differing proximities to the locally-optimised depth.

15. A method of delivering a seed to soil using the apparatus of claim 1, the method comprising:
    opening the soil with one or more leading soil-engaging tines;
    sensing one or more conditions of the soil at different depths as the soil is opened;
    adjusting the one or more leading soil-engaging tines to one of the sensed depths;
    adjusting a depth of the seed delivery on the fly to said one of the sensed depths, being a locally-optimised depth, and delivering at least most of the seed into the opened soil, in response to the sensed one or more conditions of the soil.

16. The method of claim 15, wherein the one or more leading soil-engaging tines are integrated with one or more soil-sensing elements, the one or more soil-sensing elements being configured to sense one or more conditions of the soil at different depths.

17. The method of claim 16, wherein the one or more soil-sensing elements are configured to, at least periodically, sense at two or more of the different depths at mutually differing proximities to the locally-optimised depth.

* * * * *